United States Patent Office 2,792,919
Patented May 21, 1957

2,792,919

CLUTCH FOR SPUR-WHEEL CHANGE-SPEED GEAR, ESPECIALLY FOR POWER-DRIVEN VEHICLES

Hermann Klaue, Uberlingen, Boden See, Germany, assignor of one-half to Walter Ruf, Bottighofen, Switzerland Application July 20, 1953, Serial No. 369,184

1 Claim. (Cl. 192—70)

This invention relates to spur-wheel change-speed gears, especially for power-driven vehicles.

Spur-wheel change-speed gears for power-driven vehicles are known, in which friction clutches are employed for the gear changing. In addition, clutches for power-driven vehicles are known which run outside the gear casing in order to effect a good dissipation of the heat set up by friction in the engagement of the clutch. Clutches operating in the dry state as gear-changing clutches have the advantage, as compared with clutches running in oil, that the coefficient of friction of the friction linings therein, which is from three to four times higher, can be utilised. They can therefore be constructed as two-disc clutches and, as such, have the advantage over multiple-disc clutches running in an oil bath that they can be very rapidly disengaged, whereby the efficiency of the gearing is improved and smooth gear-changing is ensured. Clutches operating in the dry state for gear-changing have not hitherto been frequently employed because difficulties are encountered in the arrangement of the clutches in spur-wheel change-speed gears and simple actuation of the clutches is not possible.

The present invention relates to a spur-wheel change-speed gear, especially for power-driven vehicles, which comprises a number of parallel transmission shafts and friction shifting clutches arranged outside the gear casing, and concerns more particularly the operation of the latter. In order that a dust-tight shifting clutch housing may be employed and that the torque may be led in and out through the clutch housing, the invention comprises a combination of the following features:

(a) Housed in each end of the transmission shaft is an actuating cylinder and an oil-actuated operating piston for the control of the clutch connecting the transmission shaft to the toothed wheels of the gearing, the ends of the said transmission shaft being constructed as clutch carriers.

(b) The oil supply for the actuating device of the shifting clutch takes place in known manner from the interior of the gear casing through a bore in the transmission shaft.

(c) The extension of the clutch housing, extending into the interior of the gear casing and sealed from the said casing, is rotatably mounted on the transmission shaft and is constructed as a hollow shaft rigidly connected to one toothed wheel of the gearing.

There is preferably employed as shifting clutch a disc clutch comprising two coupling discs, between which there are disposed spreader devices bearing at one end on the hydraulic operating piston.

Figure 1:
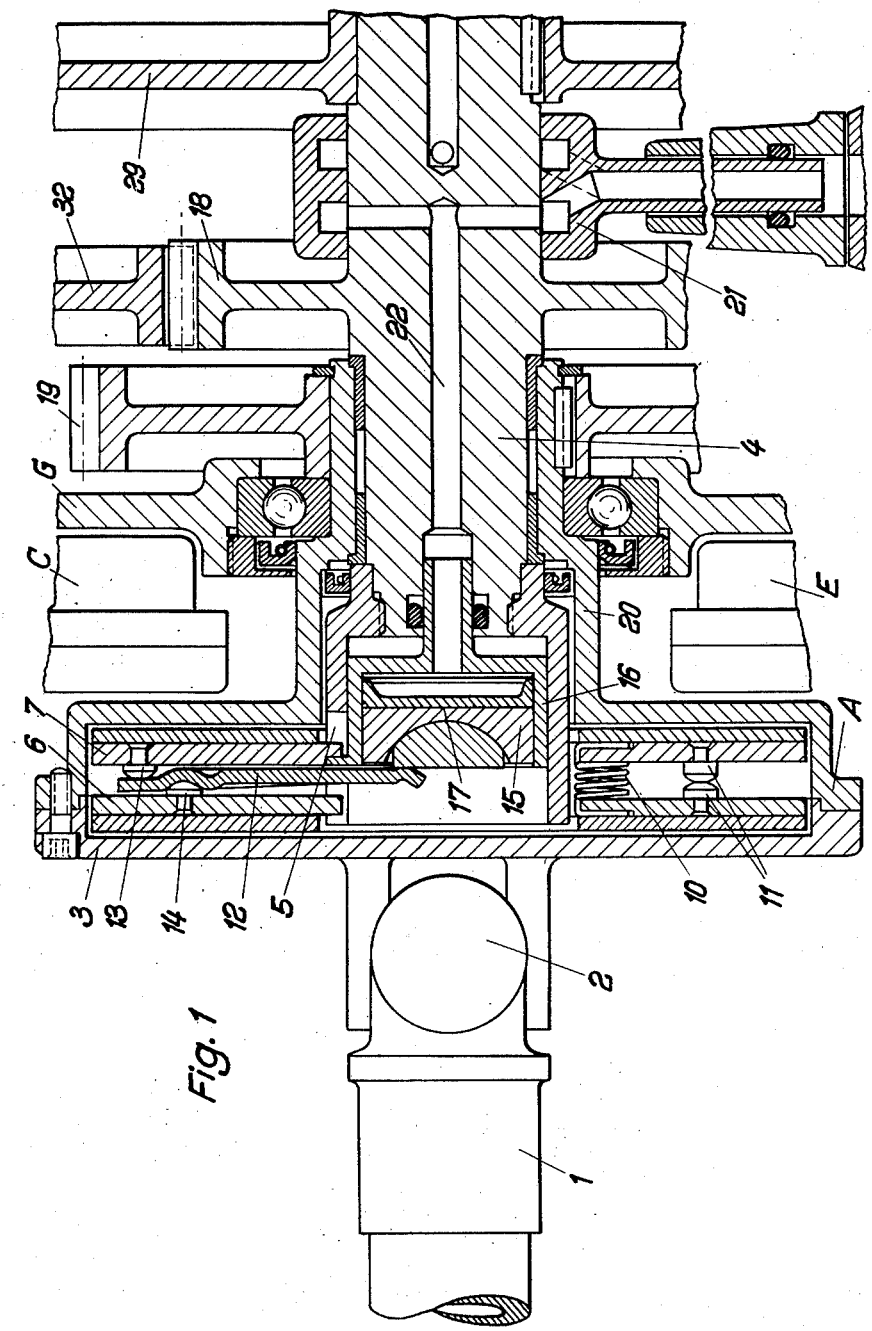
Figure 2:
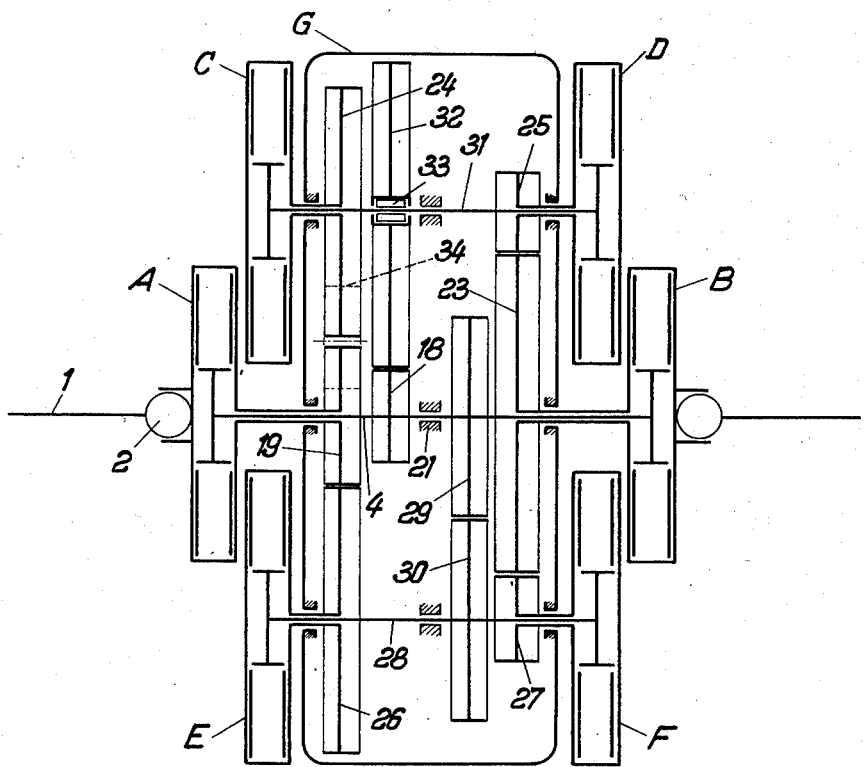

Figures 1 and 2 show by way of example an embodiment of the underlying idea of the invention. Figure 1 is an axial section through a hydraulically operating shifting clutch. Figure 2 illustrates the principle of a six-speed change gear.

In Figures 1 and 2, the driving shaft is designated by 1, and is operatively connected to the housing 3 of the shifting clutch A through the universal joint 2. The main shaft 4 of the gearing is rigidly connected to the bell-shaped coupling member 5 constructed as a clutch disc carrier, on which the clutch discs 6 and 7 provided with clutch linings are mounted for axial displacement. The clutch discs are connected together through tension springs 10 and the clutch disc carrier 5. The springs 10 press the studs 11 provided on the clutch discs 6 and 7 one against the other and thus hold the clutch discs in the disengaged position.

The radially arranged spreader levers 12 disposed at regular intervals along the periphery of the disc are mounted between the clutch discs 6 and 7 on the studs 13 and 14. The levers 12 bear at their lower ends against the piston 15, which is guided in a cylinder 16 and is sealed therefrom by the packing member 17. When pressure is admitted to the piston 15, the spreader levers 12 bear against the studs 13 and 14 and press the clutch discs 6 and 7 against the housing 3 of the shifting clutch A. The shaft 1 is thus coupled with the transmission shaft 4 and the gear wheel 18. Since the gear wheel 19 is firmly keyed on the hollow shaft extension 20 of the clutch housing 3 and the hollow shaft 20 is rotatably mounted on the main transmission shaft 4, the shaft 1 is rigidly connected to the gear wheel 19. The pressure medium is fed from the oil supply conduit 21 through the bore 22 in the transmission shaft 4 to the pressure cylinder 16.

The shifting clutches designated by A, B, C, D, E and F in Figure 2, which is a diagram illustrating the principle of the six-speed change gear, may be disc-type shifting clutches, either of the design shown in Figure 1 or of other design. For the sake of clarity, like parts have been designated by the same references in Figures 1 and 2. In both cases, the gear casing is designated by G.

The gear wheel 23 is rigidly coupled with the housing of the clutch B, the gear wheel 24 is rigidly connected to the housing of the clutch C, the gear wheel 25 is rigidly connected to the housing of the clutch D, the gear wheel 26 is rigidly connected to the housing of the clutch E and the gear wheel 27 is rigidly connected to the housing of the clutch F. The auxiliary transmission shaft 28 is connected to the main transmission shaft 4 through the pair of gear wheels 29, 30 and the auxiliary transmission shaft 31 is connected thereto through the pair of gear wheels 32, 18. The torque is transmitted from the gear wheel 32 to the auxiliary transmission shaft 31 through a free-wheel ratchet mechanism 33. The gear wheel 19 meshing with the gear wheel 26 is in addition connected to the gear wheel 24 through the reversing gear wheel 34 shown in broken lines.

The gear hereinbefore described has six forward gears and one reverse gear. In the first gear, the clutches E and D are engaged, in the second gear the clutches A and D, in the third gear the clutches E and F, in the fourth gear the clutches A and F, in the fifth gear the clutches E and B, and in the sixth gear the clutches A and B, while in the reverse gear the clutches C and D are engaged. In the various gears, the torque is therefore transmitted through the following gear wheels:

19, 26, 30, 29, 18, 32, 25, 23—in first gear
18, 32, 25, 23—in second gear
19, 26, 27, 23—in third gear
29, 30, 27, 23—in fourth gear
19, 26, 30, 29—in fifth gear
Without gear wheels—in sixth gear
19, 34, 24, 25, 23—in reverse gear

I claim:

In a clutch unit, having a driving shaft and a driven shaft aligned therewith, in combination, a female clutch member comprising a casing in driving connection with one of said shafts and having two internal oppositely disposed parallel friction surfaces, a male clutch member comprising two disks disposed in said casing and in driving connection with the other shaft and each including a friction surface parallel to that of the other disk and disposed opposite to, and engageable in dry frictional relation with, a friction surface of said female member, said disks being movable axially relative to each other in their entireties between a position of interabutment disengaged from said female friction surfaces and, respectively, a position of being spaced apart from each other and in frictional engagement with said female friction surfaces, said disks being in all positions parallel to each other, resilient means extending between said disks and operable to urge said disks into said interabutment position, and means operable to space said disks releasably apart comprising a tiltable wedge between said disks and a hydraulically powered piston including a member shiftably guided on the interior of one of said shafts, said piston being actuatable upon shifting of said guided member to tilt said wedge to force said disks apart against the power of said resilient means.

References Cited in the file of this patent

UNITED STATES PATENTS

| | | |
|---|---|---|
| 1,827,582 | Jacobs | Oct. 13, 1931 |
| 1,927,358 | Breguet | Sept. 19, 1933 |
| 2,361,120 | Peterson | Oct. 24, 1944 |
| 2,422,159 | Wood | June 10, 1947 |
| 2,553,376 | LeTourneau | May 15, 1951 |

FOREIGN PATENTS

| | | |
|---|---|---|
| 462,365 | Great Britain | Mar. 8, 1937 |
| 463,604 | Germany | Aug. 1, 1928 |